US011086627B2

(12) United States Patent
Tell et al.

(10) Patent No.: US 11,086,627 B2
(45) Date of Patent: Aug. 10, 2021

(54) INSTRUCTION LENGTH DECODER SYSTEM AND METHOD

(71) Applicant: Intel Corporation, Santa Clara, CA (US)

(72) Inventors: Nir Tell, Atlit (IL); Shahar Sandor, Atlit (IL); Amotz Yagev, Sdot Yam (IL); Michael Hermony, Santa Clara, CA (US); Sagie Yakov Goldenberg, Gaaton (IL); Lihu Rappoport, Haifa (IL)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 16/586,715

(22) Filed: Sep. 27, 2019

(65) Prior Publication Data

US 2021/0096867 A1 Apr. 1, 2021

(51) Int. Cl.
*G06F 9/30* (2018.01)
*G06F 9/38* (2018.01)
*G06F 9/54* (2006.01)

(52) U.S. Cl.
CPC ...... *G06F 9/30196* (2013.01); *G06F 9/30036* (2013.01); *G06F 9/30043* (2013.01); *G06F 9/30145* (2013.01); *G06F 9/3842* (2013.01); *G06F 9/544* (2013.01)

(58) Field of Classification Search
None
See application file for complete search history.

(56) References Cited

U.S. PATENT DOCUMENTS

| 5,758,116 A | * | 5/1998 | Lee | G06F 9/30152 |
| | | | | 712/210 |
| 5,978,899 A | * | 11/1999 | Ginosar | G06F 9/30152 |
| | | | | 712/200 |
| 6,260,134 B1 | | 7/2001 | Zuraski, Jr. et al. | |
| 6,308,257 B1 | * | 10/2001 | Theogarajan | G06F 9/30145 |
| | | | | 711/209 |
| 2004/0128479 A1 | * | 7/2004 | Madduri | G06F 9/3816 |
| | | | | 712/210 |
| 2004/0236926 A1 | | 11/2004 | Tran et al. | |

(Continued)

OTHER PUBLICATIONS

Extended European Search Report for EP Application No. 20181350.8 dated Jan. 18, 2021.

*Primary Examiner* — Eric Coleman
(74) *Attorney, Agent, or Firm* — Fletcher Yoder, P.C.

(57) ABSTRACT

A system is provided that includes an instruction buffer that stores bytes representative of one or more macroinstructions and instruction length decoder circuitry. The instruction length decoder circuitry includes a non-sequential first multiplexer circuitry having first input lines receiving a first input data representative of a speculative length of a first macroinstruction of the macroinstructions, and first selector that selects from the first input lines via a one-hot selector vector. The instruction length decoder circuitry also includes a first output line communicatively coupled to second selector, wherein the first output line causes the selector to select from a second input data representative of a first location of a first ending byte for the first macroinstruction with respect to a value x. The first multiplexer circuitry and the second selector may output start and end byte locations for the macroinstructions.

20 Claims, 8 Drawing Sheets

(56) References Cited

U.S. PATENT DOCUMENTS

| | | | |
|---|---|---|---|
| 2009/0019263 A1 | 1/2009 | Shen et al. | |
| 2010/0299503 A1* | 11/2010 | McDonald | G06F 12/0875 <br> 712/210 |
| 2012/0066478 A1* | 3/2012 | Cohen | G06F 9/30152 <br> 712/205 |

* cited by examiner

INSTRUCTION LENGTH DECODER SYSTEM AND METHOD

BACKGROUND

The present disclosure generally relates to integrated circuit devices and, more particularly, to decoding instruction lengths for instructions executable via the integrated circuit devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain microprocessor architectures included in integrated circuit devices, such as a complex instruction-set computing (CISC) architectures, microprocessor instructions may vary in length. For example, a machine language instruction such as "ADD" may include a length in bytes different than a "JMP" instruction. Furthermore, the instructions may be stored in a data block of instructions in an unaligned manner. That is, a boundary between any two instructions may vary based on instruction length, operands for the instruction, and so on. During program execution, the length of the instructions may be determined and used to retrieve and to execute the instructions in the data block. Accordingly, it would be advantageous to provide for instruction length decoding techniques which may more quickly determine the length of a variable length instruction so that instruction data blocks may be more efficiently executed by the integrated circuit device.

DETAILED DESCRIPTION OF SPECIFIC EMBODIMENTS

Figure 1:
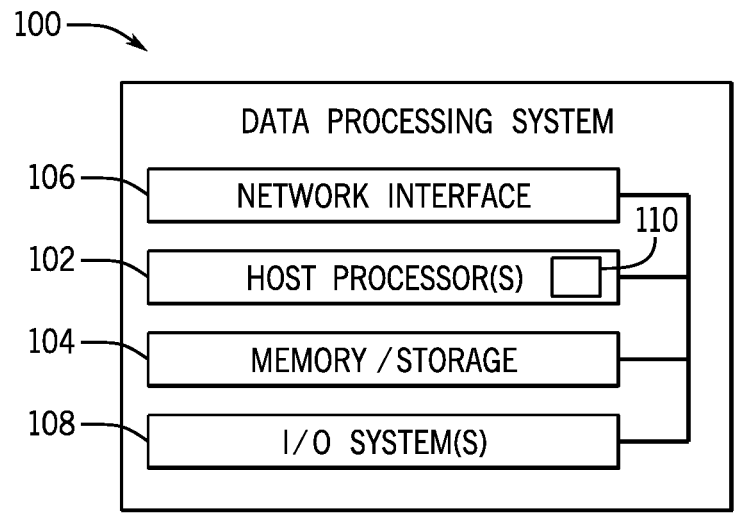
FIG. 1 is a block diagram of a data processing system including one or more processors each having an instruction execution pipeline, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In certain microprocessor architectures, such as a complex instruction-set computing (CISC) architectures, pipelined processors may be used for execution of computer code. For example, a computer program written in a high-level language such as C or C++ may be compiled or otherwise translated into assembly-level macroinstructions that may include a variable length format for execution by one or more of the processors. The variable length format may include variable length instruction opcode, and/or variable length immediate and address displacements. In one example variable length format, the variable length format may be described in a reference manual, such as the Intel® 64 and IA-32 Architectures Software Developer's Manual (Vol. 2: Instruction Set Reference, A-Z), September 2016, available from Intel® Corporation, of Santa Clara, Calif., U.S.A.

The macroinstructions may be stored, for example, in fixed length (e.g., 16 bytes, 32 bytes, 64 bytes, and so on) data blocks of an instruction cache, main memory, and the like, in an unaligned manner. Accordingly, boundary markers between instructions may not be stored and instead may be computed during instruction decoding. In certain embodiments, the one or more macroinstructions may be continuously fetched (e.g., from the instruction cache) at certain processor operating frequencies (e.g., 3 GHz, 4, GHz, 5 GHz, 7 GHz, or more) and at predetermined data block sizes (e.g., 16 bytes, 32 bytes, 64 bytes, 128 bytes, and so on). The techniques described herein may then determine a length for each of the instruction(s) that are being fetched by using certain multiplexor-based instruction length decode chains, as further described below. Once the instruction length is derived, each macroinstruction fetched may then be decoded into one or more microinstructions (e.g., μops) suitable for execution by one or more execution units of the processor(s). By continuously fetching macroinstructions of a computer program, deriving the instruction length for each macroinstruction, decoding each macroinstruction into microinstructions, and executing the microinstructions, the techniques described herein may more efficiently execute the computer program.

With the foregoing in mind, FIG. 1 is a block diagram of a data processing system 100 including one or more processor(s) 102, in accordance with an embodiment of the present disclosure. The data processing system 100 may include more or fewer components (e.g., electronic display, user interface structures, application specific integrated circuits (ASICs)) than shown. The data processing system 100 may execute certain code or computer instructions via the or more processors 102, such as an INTEL® 10$^{th}$ generation processor (e.g., Ice Lake processor) that may manage data processing requests for the data processing system 100 (e.g., to perform machine learning, video processing, voice recognition, image recognition, data compression, database search ranking, bioinformatics, network security pattern identification, spatial navigation, or the like).

The processor(s) 102 may communicate with the memory and/or storage circuitry 104, which may be a tangible, non-transitory, machine-readable-medium, such as random-access memory (RAM), read-only memory (ROM), one or more hard drives, flash memory, or any other suitable optical, magnetic or solid-state storage medium. The memory and/or storage circuitry 104 may hold data to be processed by the data processing system 100, such as processor-executable control software, configuration software, system parameters, configuration data, etc.

The data processing system 100 may also include a network interface 106 that allows the data processing system 100 to communicate with other electronic devices. In some embodiments, the data processing system 100 may be part of a data center that processes a variety of different requests. For instance, the data processing system 100 may receive a data processing request via the network interface 106 to perform machine learning, video processing, voice recognition, image recognition, data compression, database search ranking, bioinformatics, network security pattern identification, spatial navigation, or some other specialized task. The data processing system 100 may also include one or more input/output systems 108, such as display devices (e.g., computer monitors), keyboards, mice, speakers, voice input devices, and so on, useful for entering and/or displaying information.

Figure 2:
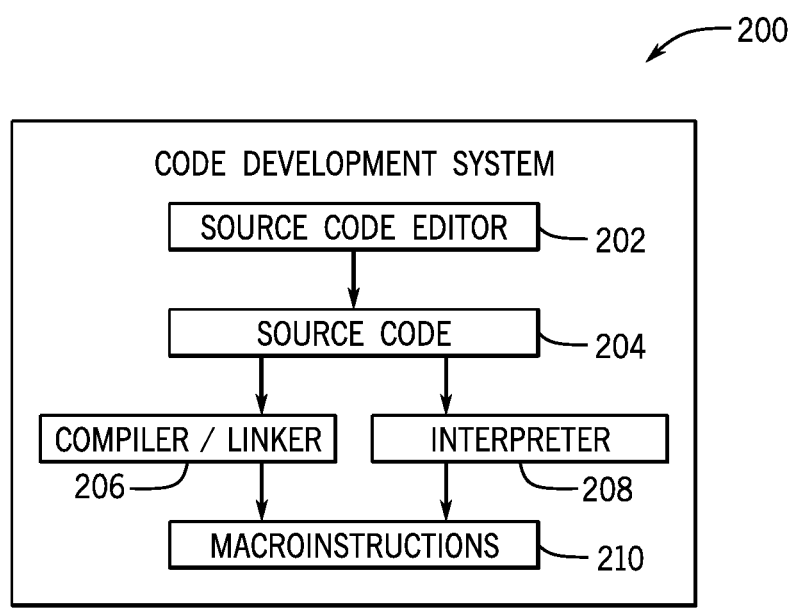
FIG. 2 is a block diagram illustrating an embodiment of a code development system suitable for creating one or more macroinstructions executable via the instruction execution pipeline of FIG. 1.

In the depicted embodiment, the processor 102 includes an instruction execution pipeline system 110. In use, the instruction execution pipeline system 110 may execute a computer program by fetching computer instructions, such as macroinstructions, determining an instruction length, and then decoding the macroinstructions into microinstructions (e.g., μops). The microinstructions may then be executing via one or more execution units also included in the processor 102. An example system suitable for creating the macroinstructions is shown in FIG. 2. More specifically, FIG. 2 is a block diagram of a code development system 200 that includes a source code editor 202, in accordance with an embodiment of the present disclosure.

In use, a computer developer may interact with the source code editor 202 to produce a computer program or source code 204. For example, the source code 204 may include computer instructions writing in a language such as C, C++, C#, Python, PERL, and the like. The source code 204 may include instructions for the data processing system 100 to perform machine learning, video processing, voice recognition, image recognition, data compression, database search ranking, bioinformatics, network security pattern identification, spatial navigation, or the like. The source code 204 may then be translated, for example, by a compiler/linker system 206 and/or an interpreter system 208 into macroinstructions 210. For example, the compiler/linker system 206 may apply computer language translation techniques to translate the source code 204 into the macroinstructions 210. Likewise, the interpreter system 208 may continuously translate the source code 204 "on-the-fly" into the macroinstructions 210. Depending on the processor 102 architecture being targeted, e.g. an Intel® architecture, the macroinstructions 210 may include a variable length macroinstruction format suitable for execution by the targeted processor 102 architecture. That is, a first length of a first macroinstruction may be different then a second length of a second macroinstruction. Further, the same macroinstruction may vary in length based on certain operands and the like, as shown in FIG. 3.

Figure 3:
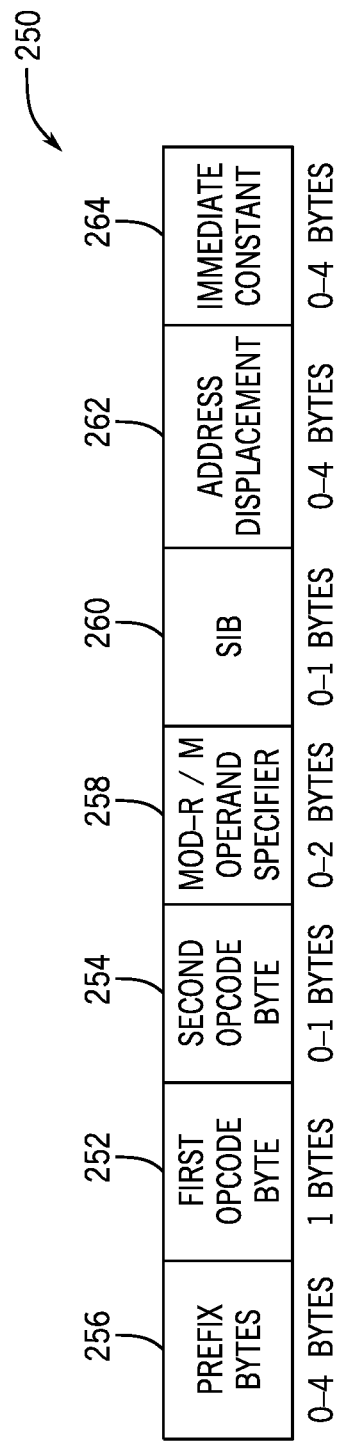
FIG. 3 is a block diagram illustrating an embodiment of a variable length macroinstruction format that may be used by the code development system of FIG. 2 to create the one or more macroinstructions.

FIG. 3 is a block diagram of a variable length macroinstruction format 250, in accordance with an embodiment of the present disclosure. The format 250 may adhere to variable length format(s) for macroinstructions described in the Intel® 64 and IA-32 Architectures Software Developer's Manual (Vol. 2: Instruction Set Reference, A-Z), September 2016, available from Intel® Corporation, of Santa Clara, Calif., U.S.A. In the macroinstruction format 250, the length of a macroinstruction may vary between one byte to fifteen bytes. In the depicted embodiment, only one byte may be required. The one byte may be stored as a first opcode byte 252. A second opcode byte 254 is optional. The first (and possibly second) opcode bytes 252, 254, may decode into a macroinstruction such as "ADD", "JMP", "MOV", and so on. Additionally, the macroinstruction format 250 may include zero to four prefix bytes 256 which may precede the first opcode byte 252. The prefix bytes 256 may be divided into functional groups and may affect the operation of the macroinstruction. For example, a "LOCK" prefix may result in the atomic execution (e.g., bus LOCK cycle while executing the macroinstruction) of certain read-modify-write macroinstructions.

The macroinstruction format 250 may also include one or two optional modify registers and/or memory (MOD-R/M) operand specifier bytes 258. The MOD-R/M operand specifier bytes 258 may indicate the types of source and destination operands that are to be used with the macroinstruction. A combination of memory and register source and destination operands are possible. For example, a source operand may be specified to be a memory location, while a destination operand may be specified to be a register included in the processor 102. The macroinstruction format 250 may additionally include one scale, index, base (SIB) byte 260. The SIB byte 260 may indicate a scale factor (e.g., 1, 2, 4, or 8) to use, an index register to use, and a base register to use, for example, during addressing modes (e.g., scaled indexed addressing mode) for the opcodes 252, 254. Zero to four address displacement bytes 262 may also be included. The address displacement bytes 262 may provide for a displacement of operand address, which may be added to base address to result in a virtual address. Immediate constant bytes 264 may include up to four bytes for storing a constant value, for example, storing a constant that is to be added, subtracted, and so on.

Macroinstructions 210 may thus be formatted based on the macroinstruction format 250 and subsequently stored contiguously in a data block of fixed size. For example, a data block may include a fixed length of 16 bytes and may store at least one macroinstruction 210. For a data block of 32 bytes, two or more macroinstructions 210 may be stored, for a data block of 64 bytes, four or more macroinstructions 210 may be stored, and so on. In the macroinstruction format 250, the length of the instruction from the first opcode byte 252 until the last byte of the instruction (e.g., immediate constant byte 264) may be determined by examining the first opcode byte 252 and several subsequent bytes (e.g., three subsequent bytes). For ease of reference, a "raw" macroinstruction may refer to a macroinstruction 210 that either has no prefix bytes 256 or that has had its prefix bytes 256 removed. The techniques described herein include an instruction length decoder system that may be used to more efficiently process variable length macroinstructions 210 in the instruction execution pipeline system 110, as further described with respect to FIG. 4.

Figure 4:
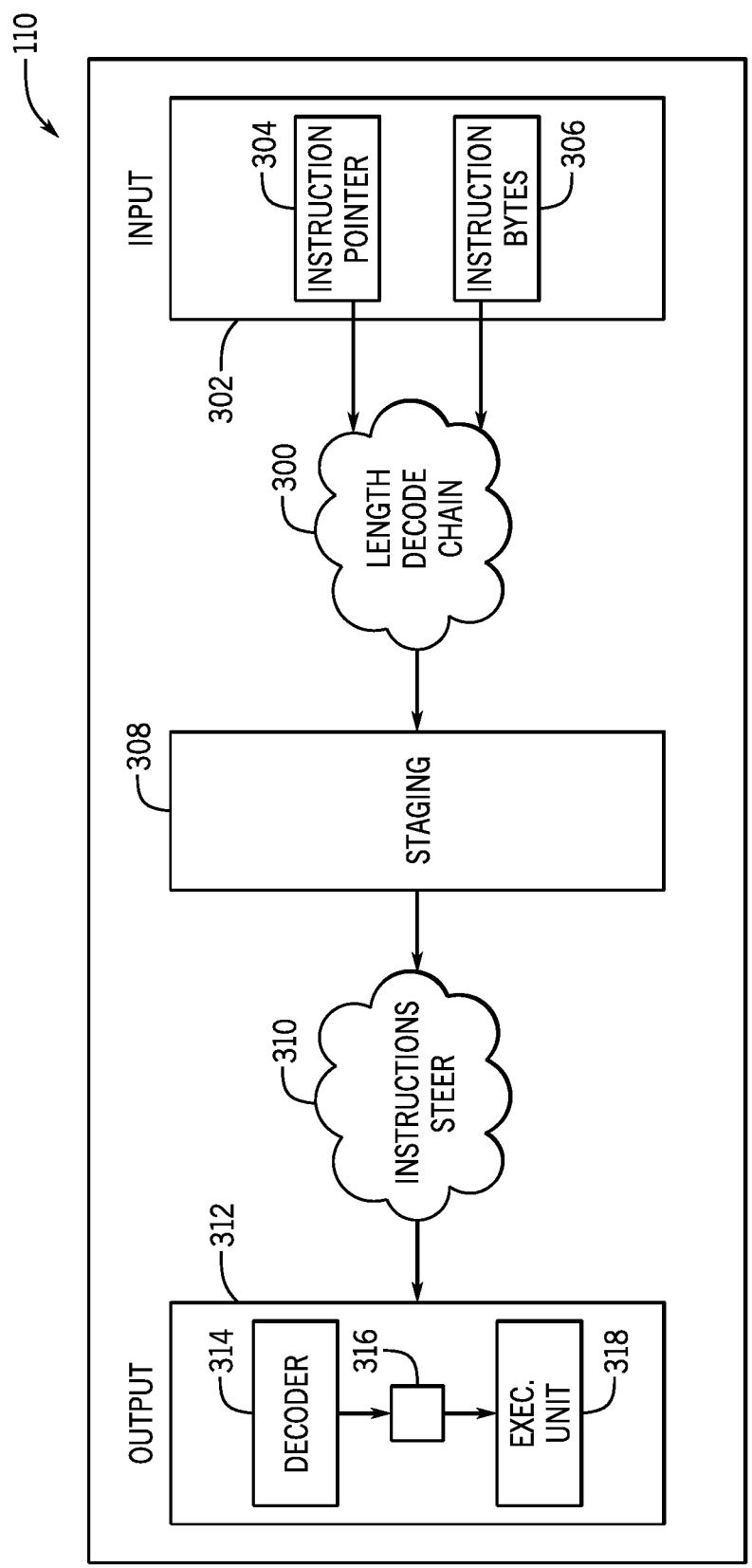
FIG. 4 is a block diagram illustrating of an embodiment of the instruction execution pipeline of FIG. 1 that includes an instruction length decode chain system suitable for deriving a start and an end byte for variable-length macroinstruction(s)

Turning now to FIG. 4, the figure is a block diagram of an embodiment of the instruction execution pipeline 110 that may include a speculative instruction length decode chain system 300 suitable for deriving a length for each of the macroinstructions 210. In the depicted embodiment, an input block 302 may provide as input an instruction pointer 304 and a stream 306 of macroinstruction 210 bytes. The instruction pointer 304, also sometimes referred to as a program counter, may indicate a next macroinstruction to be executed by the processor 102. The stream 306 may be fetched at a desired size, e.g., 32 bytes, and provided to the speculative instruction length decode chain system 300, for example, via an instruction streaming buffer. The speculative instruction length decode chain system 300 may then determine a length for one or more macroinstructions in the stream 306, and thus mark start and end instruction boundaries. For example, the speculative instruction length decode chain system 300 may determine the start and end bytes for the macroinstructions in one cycle of the processor 102, as further described below, and the macroinstructions may then be staged via a staging system 308.

The staging system 308 may align one or more macroinstructions 210, for example, so that the first opcode byte 252 is at a known location, and the macroinstructions 210 may then be steered or otherwise redirected by a steering system 310 for further processing by an output block 312. As mentioned earlier, a macroinstruction may be executed by executing one or more microinstructions or μops. For example, decoder 314 may decode each aligned and steered macroinstruction 210 into set of microinstructions 316. The microinstructions 316 may then be executed by one or more execution units 318. By using the techniques described herein, a more efficient length decoding (e.g., marking of start and/or end bytes) of the macroinstructions 210 may be provided.

Figure 5:
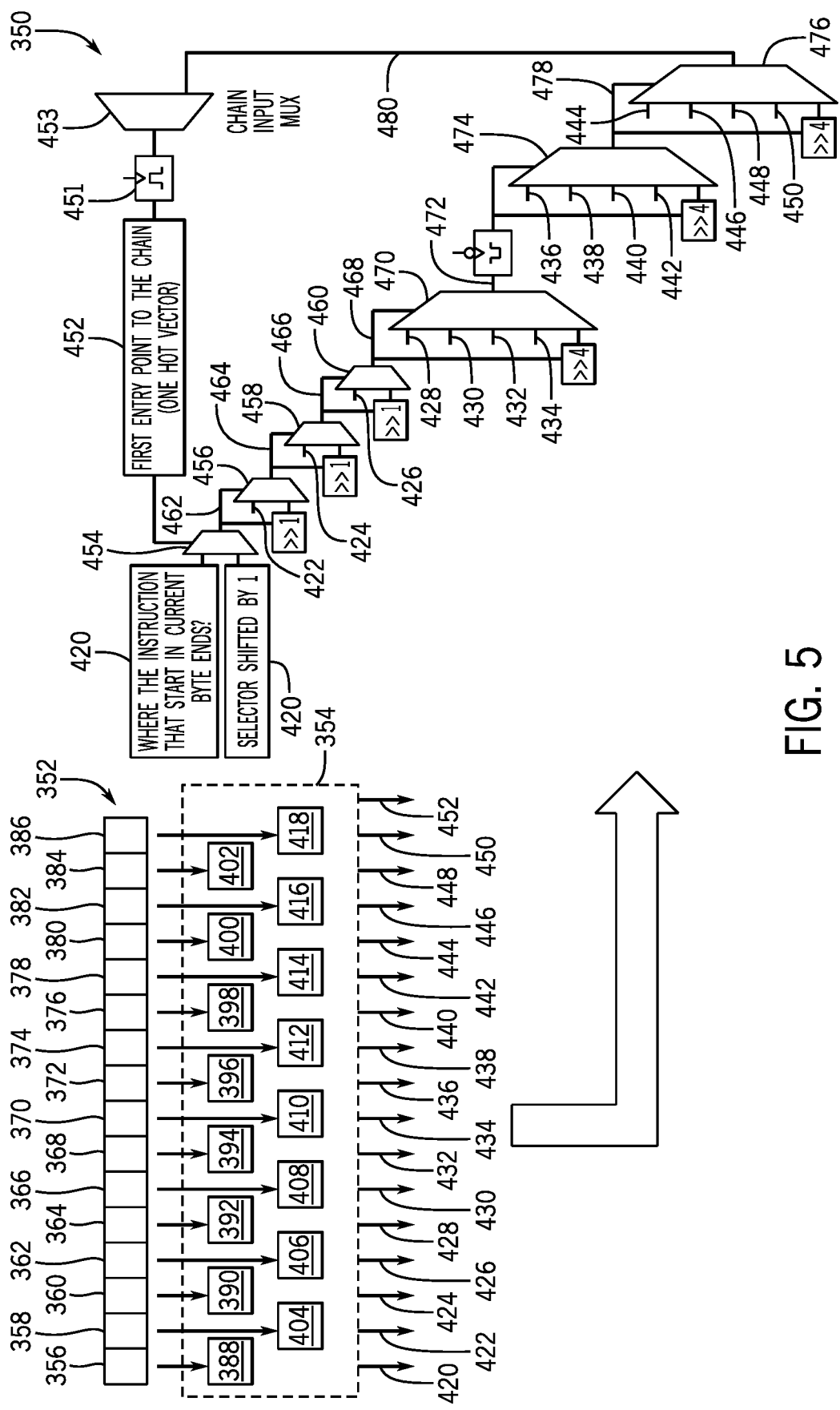
FIG. 5 is a schematic diagram depicting an embodiment of an instruction length decode chain system having multiple multiplexers that may be used to derive start and end bytes.

It may be useful to describe an implementation of the instruction length decode chain system 300, for example, that includes certain multiplexing techniques that use a "one hot" selector first entry point into the decode chain (e.g., speculative decode chain). Turning now to FIG. 5, the figure is a schematic diagram of an embodiment of a speculative instruction length decode chain system 350 that may be used to decode 16 byte macroinstruction data, such as when the macroinstruction bytes are provided in 16 byte data blocks, such as via a 16 byte instruction block or buffer 352. In the depicted embodiment, the instruction buffer 352 may send 16 bytes of macroinstruction data to a programmable logic array-based (PLA) circuitry 354. For example, each byte 356, 358, 360, 362, 364, 366, 368, 370, 372, 374, 376, 378, 380, 382, 384, 386 of the instruction buffer 352 may be communicatively coupled to a respective PLA 388, 390, 392, 394, 396, 398, 400, 402, 404, 406, 408, 410, 412, 414, 416, and 418 of the PLA-based circuitry 354.

The PLA-based circuitry 354 may convert each of the bytes 356-386 into outputs, such as outputs 420, 422, 424, 426, 428, 430, 432, 434, 436, 438, 440, 442, 444, 446, 448, representative of the inputs bytes 356, 358, 360, 362, 364, 366, 368, 370, 372, 374, 376, 378, 380, 382, 384, and 386, respectively. For example, the first byte 356 may be assumed to be a first opcode byte, and thus the first four bytes 356, 358, 360, and 362 may be used to determine an opcode length. For example, a lookup table having opcodes and corresponding lengths may be used to determine opcode byte length. An end marker byte for the instruction may then be found in any one of the remaining bytes 358, 360, 362, 364, 366, 368, 370, 372, 374, 376, 378, 380, 382, 384, and 386 by using the speculative instruction length decode chain system 350.

In the depicted embodiment, during a high pulse 451, a "one hot" vector 452 outputted via a multiplexer 453 may be used as the first entry point to a multiplexer 454. That is, the "one hot" vector 452 may include a single "hot" bit (e.g., high bit or logical '1') used to select an input of the multiplexer 454 when first entering into the speculative instruction length decode chain system 350. The "one hot" vector 452 may be used to first speculate an ending byte 420 for the macroinstruction being length decoded, with inputs 422, 424, and 426 of the multiplexers 456, 458, and 460 used to serially decode the first four bytes 356, 358, 360, and 362. As shown, output 462 of the serial multiplexer 454 is used as a selector for the multiplexer 456, output 464 of the multiplexer 456 is used as a selector for the multiplexer 458, and output 466 of the serial multiplexer 458 is used as a selector for the multiplexer 460. Likewise, the fourth serial multiplexer 460 has an output 468 used as a selector for a multiplexer 470. The output 462 of the serial multiplexer 454 may additionally be shifted by one as used as input to the multiplexer 456, likewise, the outputs 464, 466, and 468 may all be shifted by one and used as inputs into the multiplexers 458, 460, and 470, respectively. In use, the inputs 428, 430, 432, and 434 of the multiplexer 470 may be used to refer to a condition "if the macroinstruction ends in the fourth, fifth, sixth or seventh byte" (e.g., bytes 362, 364, 366, 368), respectively. The selector 468 may then provide as output 472 an answer as to where the macroinstruction ends with respect to the seventh byte, e.g., 2 bytes from byte 368 and thus the macroinstruction ends at byte 5. The term "selector" as used herein may be used to describe one or more lines that are used to select among inputs of a multiplexer circuitry or other selection circuitry to provide an output. For example, in a multiplexer having two inputs, a selector (e.g., line used to select among the inputs) may receive a "0" or a "1" to select one of the two inputs and provide the selected input as the multiplexer's output. The term "selection circuitry" may refer to a multiplexer circuitry but also to other circuitry that may be used to select from two or more inputs and to provide the selected input as the output to the circuitry. For example, AND gates, NAND gates, OR gates, and so on, may be used to build selection circuitry.

During a down portion of the cycle, multiplexers 474 and 476 may be used to determine, for example, if the ending byte for the macroinstruction ends at the eighth, ninth, tenth, or eleventh byte (e.g., bytes 372, 374, 376, 378) or ends at the twelfth, thirteenth, fourteenth, or fifteenth byte, (e.g., bytes 380, 382, 384, 386) respectively. For example, the output 472 may be used as a selector for the multiplexer 474 useful in selecting one of the inputs 436, 438, 440, 442 representative of bytes 372, 374, 376, 378. As illustrated, the output 472 is also shifted by 4 bits and used as another input by the multiplexer 474. Accordingly, the output 478 of the multiplexer 474 is used as a selector for the last multiplexer 476 in the chain 350. The multiplexer 476 may in turn include inputs 444, 446, 448, and 450 representative of bytes 380, 382, 384, and 386, as well as the output 478 shifted by 4 bits.

An output 480 of the multiplexer 476 may then be used to mark the end byte for the macroinstruction via the speculative instruction length decode chain system 350. As a second block having 16 bytes of macroinstruction data is loaded in the instruction buffer 352, the output 480 may then be used to select an input 420, 421 from the first multiplexer 454. By continuously decoding a stream of bytes entering the instruction buffer 352, the speculative instruction length decode chain system 350 may more efficiently process, in a single cycle, 16 bytes of data. Additionally, the speculative instruction length decode chain system 350 may process 32 bytes of data in two cycles. However, it may be beneficial to process, in a single cycle, an increased amount of macroinstruction data, such as 32 bytes of macroinstruction data.

Figure 6:
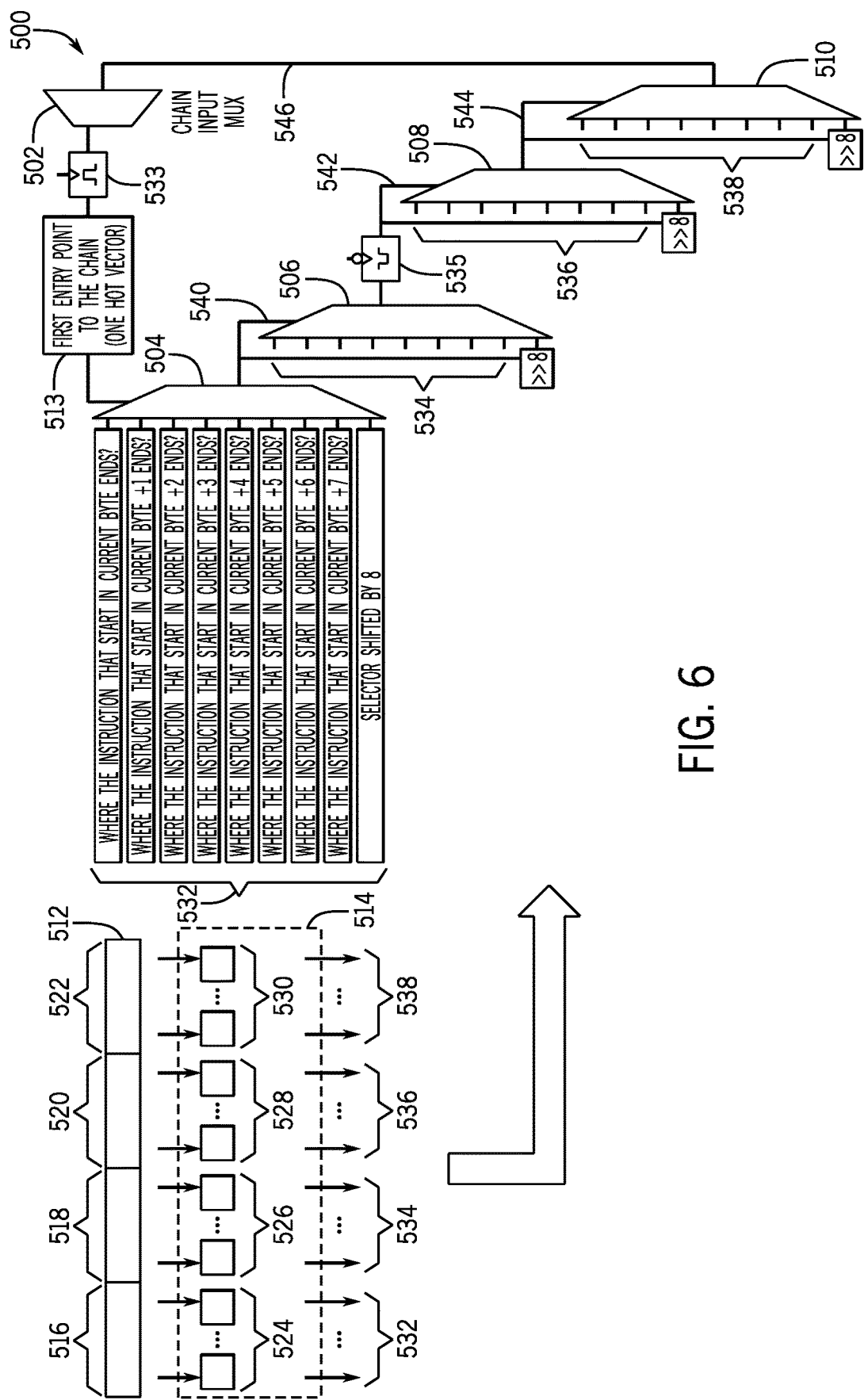
FIG. 6 is a schematic diagram depicting another embodiment of an instruction length decode chain system having multiple multiplexers that may be used to derive start and end bytes.

Turning now to FIG. 6, the figure illustrates a speculative instruction length decode chain system 500 suitable for processing 32 bytes of macroinstruction data in one cycle. In the depicted embodiment, the speculative instruction length decode chain system 500 includes a chain input multiplexer 502 and four chain processing multiplexers 504, 506, 508, and 510. Also shown is an instruction block or buffer 512, which may store, for example, 32 bytes of macroinstruction data. As mentioned earlier, the instruction buffer 512 may store macroinstruction 210 to be processed by a PLA-based circuitry 514. When the instruction buffer 512 is 32 bytes long, the instruction buffer 512 may store at least two macroinstructions 512. Accordingly, a selector vector 513 may be 32 bits long.

In the depicted embodiment, byte sections 516, 518, 520, and 522 (e.g., 8 bytes in each section) may be processed by PLA sections 524, 526, 528, and 530, respectively. For example, a PLA in each of the PLA sections 524, 526, 528, and/or 530 may encode a respective byte incoming from the instruction buffer 512. The bytes encoded by the PLA sections 524, 526, 528, and/or 530 may then result in output byte sections 532, 534, 536, and 538 (e.g., 8 bytes in each section). For example, bytes 532 may encode a speculative length, that is, where the instruction that starts in the current byte (e.g., first byte of section 516) ends, where the instruction that starts in the current byte+1 (e.g., first byte of section 516 plus 1) ends, where the instruction that starts in the current byte+2 ends, and so on. The selector vector 513 of the multiplexer 503 may first be triggered on a high pulse 533 portion of a single processor cycle to speculative select one of the inputs 532 based, for example, on speculating on instruction length.

In the illustrated embodiment, section 534 may encode where the instructions end with respect to byte 7, e.g. the instructions may end at byte 8, byte 9, byte 10, and so on. On a down or low pulse 535 of the single cycle, section 536 may speculate on the length of a second macroinstruction, for example, that starts after the end byte of the first macroinstruction processed via the first multiplexer 504. Accordingly, the following section, section 538, may correspond to where the second macroinstruction in the second set of bytes ends with respect to or relative to a given byte, such as byte 7 of a second set of bytes containing the second macroinstruction. For example, the second instruction may end at byte 8, byte 9, byte 10, and so on.

An output 540 of the multiplexer 504 may then be used as a selector for the multiplexer 506. The output 540 may also be shifted (e.g., shifted 4 bytes) and then used as input for the multiplexer 506. Likewise, an output 542 of the multiplexer 506 may be used both as a selector for the multiplexer 508 as well as an input for the multiplexer 508 when shifted by certain number of bytes (e.g., shifted 4 bytes). An output 544 of the multiplexer 510 may be used as input to the multiplexer 502, thus iteratively processing data in the input buffer 512. Advantageously, the speculative instruction length decode chain system 500 may continuously decode, for example, 32 bytes of data in one processor cycle, thus improving processor 102 throughput and efficiency.

Figure 7:
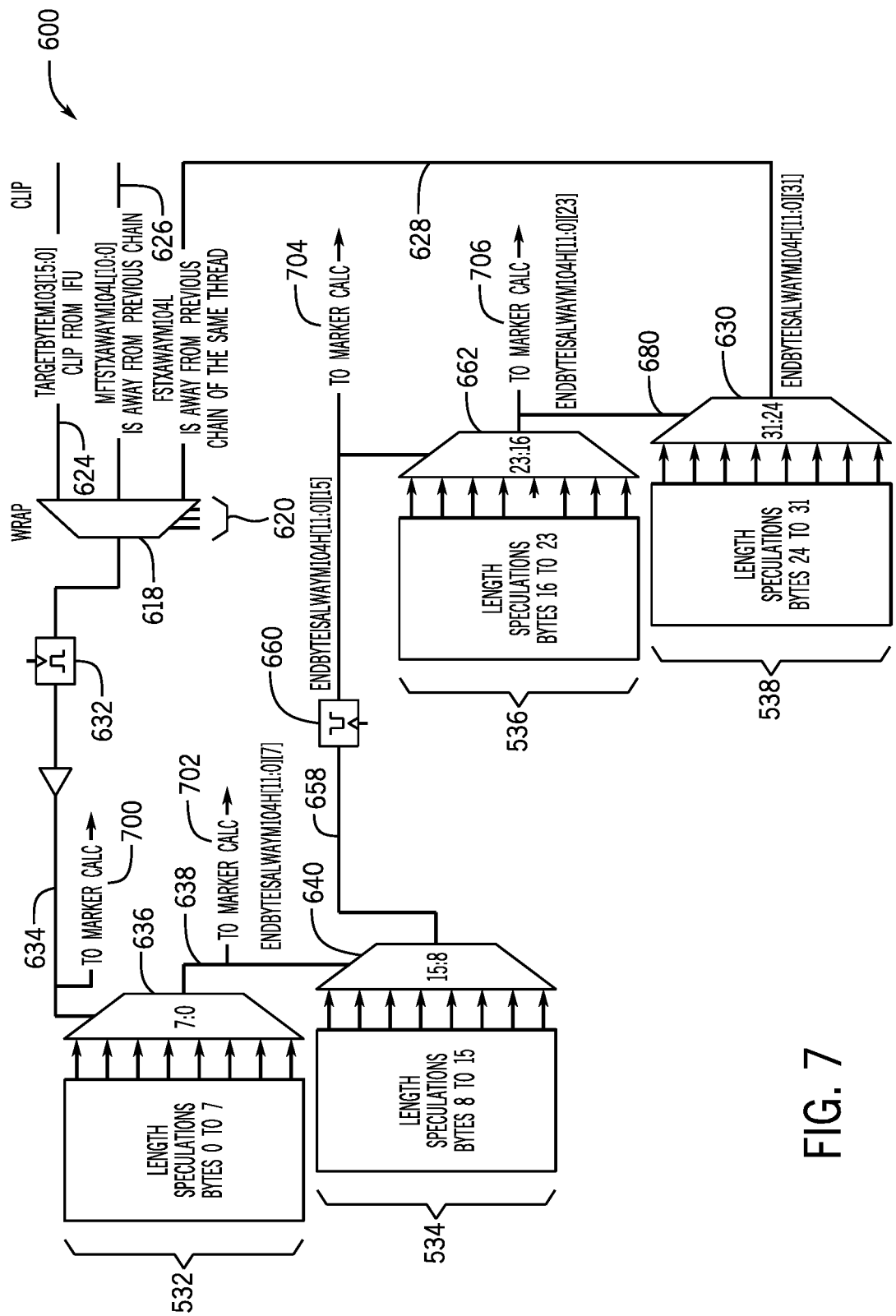
FIG. 7 is a schematic diagram depicting an embodiment of an instruction length decode chain system having multiple multiplexers that may be used to derive start and end bytes, showing further input details.

It may be beneficial to illustrate further details of byte inputs that may be used in implementing speculative instruction length decode chain systems. For example, FIG. 7 illustrates a speculative instruction length decode chain system 600 showing further details for the input bytes of sections 532, 534, 536, and 538. In the depicted embodiment, the input section 532 includes lines that speculate lengths based on bytes 0-7 of the macroinstruction being analyzed. As mentioned earlier, lines of the input section 532 are selected via multiplexer 618. For example, the multiplexer 618 may include selectors 620 and inputs 622. In the depicted embodiment, the selectors 620 may select as input 622 either data 624 from an instruction fetch unit (IFU), data 626 from a previous chain (e.g., another speculative instruction length decode chain system 600), or data 628 incoming from the speculative instruction length decode chain system 600 itself (e.g., incoming as output of multiplexer 630).

During a high pulse 632 portion of a single processor cycle, the selectors 620 may enable the use of one of the inputs 622 as a selector 634 for multiplexer 636. As shown, the selector 634 may select one of the lines of the input section 532. For example, based on a speculative length of a macroinstruction starting on the first byte of section 516, the selector 632 may select one of the lines from section 532. Output 638 of the multiplexer 636 may then be used as a selector for multiplexer 640. Input section 534 may include various lines representative of speculative length based on bytes 8-15. The lines of section 534 may be selected based on where the ending byte for the macroinstruction is with respect to a byte, such as byte 7.

Output 658 of the multiplexer 640 may then be used during a low pulse 660 of the single cycle as a selector for multiplexer 662. For example, input section 536 for the multiplexer 662 may include lines representative of speculative length based on bytes 16-23 that are selectable via the output (e.g., selector) 658. Output 680 of the multiplexer 662 may then be used as a selector for the multiplexer 630. As illustrated, the multiplexer 630 includes section 538 having lines representative of speculative length based on bytes 24-31. The multiplexer 630 may then provide the output 628 as input into the multiplexer 618. Also shown are lines 700, 702, 704, and 706 outgoing into marker circuitry from lines 634, 638, 658, and 680, respectively. The lines 700, 702, 704, and 706 may be used to send data to marker circuitry capturing the outputs 634, 638, 658, and 680 of multiplexer, such as speculative start and end bytes for the macroinstructions being processed by the speculative instruction length decode chain system 600. By continuously processing inputs 532, 534, 536, and 538 (e.g., 32 bytes of data or more) in one cycle of the processor 102, the techniques described herein may enable "wide" data paths in instruction length decoding systems, thus improving throughput and data efficiency.

It may be beneficial to describe an embodiment of a speculative instruction length decode chain system that uses a smaller number of input lines in each multiplexer. For example, using less input lines may enable a more compact on-chip arrangement (e.g., transistor arrangement) for the for speculative instruction length decode chain system.

Figure 8:
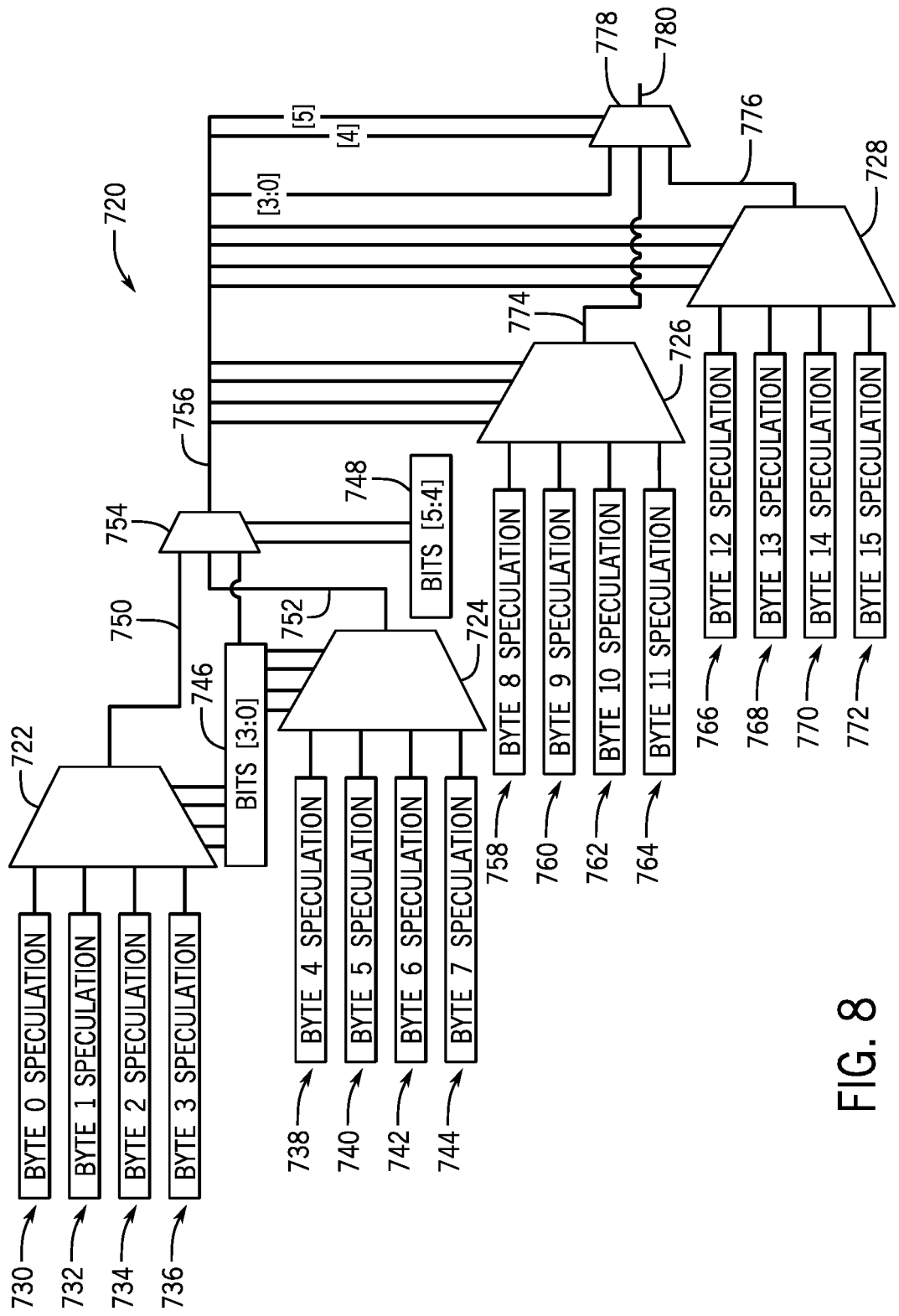
FIG. 8 is a schematic diagram depicting another embodiment of an instruction length decode chain system having multiple multiplexers that may be used to derive start and end bytes, showing further input details.

Turning now to FIG. 8, the figure illustrates an embodiment of a speculative instruction length decode chain system 720 having multiplexers 722, 724, 726, and 728 that each have at most 4 input lines. In the depicted example, multiplexer 722 includes four input lines 730, 732, 734, and 736. The input lines 730, 732, 734, and 736 as shown may enable the flow of data representative of bytes 0, 1, 2, and 3 of a macroinstruction. Likewise, multiplexer 724 includes four input lines 730, 732, 734, and 736. The input lines 738, 740, 742, and 744 as shown may enable the flow of data representative of bytes 4, 5, 6, and 7. In use, a four bit selector 746 in combination with a two bit selector 748 may select a speculative length of a first macroinstruction, e.g., macroinstruction stored in input buffer 512. For example, the selectors 746 and 748 may speculate on a length for a macroinstruction undergoing analysis (e.g., inputs 739-744). More specifically output 750 of multiplexer 722, output 752 of multiplexer 724, and bits 746 may then be used as an input into a multiplexer 754 having bits 748 as a selector. Input lines 730, 732, 734, 736, 738, 740, 742, 744 may have been encoded via a circuitry, such as the PLA-based circuitry 514. That is, PLAs may be used to transform macroinstruction bytes to derive certain speculative lengths as previously described (e.g., via look up tables) to encode signals for 730, 732, 734, 736, 738, 740, 742, 744. Selectors 746, 748 may be similarly encoded.

Output 756 of the multiplexer 754 may then be used to determine, for example, an ending byte with respect to byte 7 of the macroinstruction being processed. Accordingly, the output 756 may be used as a selector for the multiplexers 726 and 728. For example, selector 756 may select an input line 758, 760, 762, or 764 of the multiplexer 726, and an input line 766, 768, 770, and 772 of the multiplexer 728. Output 774 of the multiplexer 726 and output 776 of the multiplexer 728 may then be used as inputs into a multiplexer 778. The first four bits, bits 0-3, of the output 756 of the multiplexer 754 may be used as another input into the multiplexer 778. Bits 4 and 5 of the output 756 of the multiplexer 754 may be used as selector bits for the multiplexer 778. Output 780 of the multiplexer 778 may then be representative of the end byte for the macroinstruction. Output 780 may also be used as a selector into a second speculative instruction length decode chain system 720 to process, for example, a total of 32 bytes of data when two speculative instruction length decode chain systems 720 are used. Input lines 758, 760, 762, 764, 766, 768, 770, 772 may have been encoded via a circuitry, such as the PLA-based circuitry 514. That is, PLAs may be used to transform macroinstruction bytes to derive certain speculative lengths as previously described (e.g., via look up tables) to encode signals for lines 758, 760, 762, 764, 766, 768, 770, 772.

Figure 9:
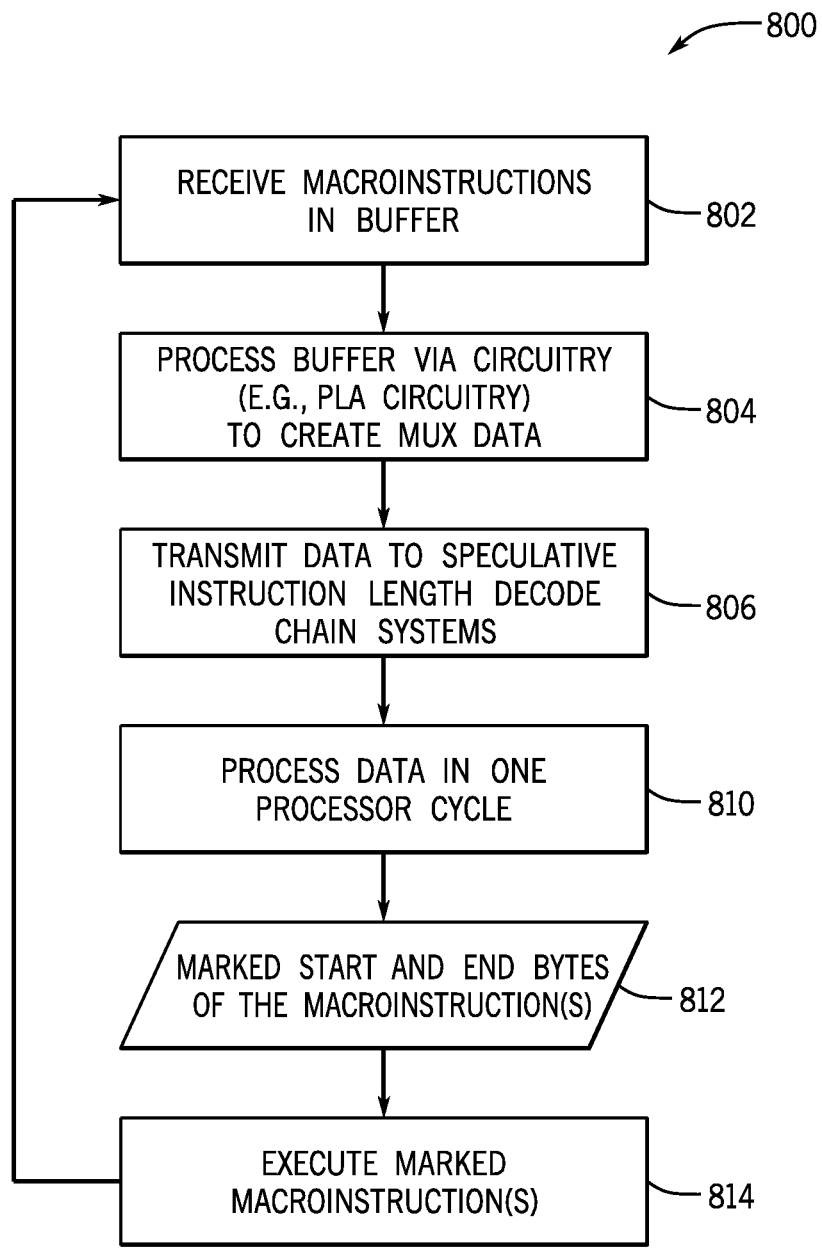
FIG. 9 is a flowchart showing an embodiment of a process suitable for marking start and end bytes of variable length macroinstructions.

FIG. 9 is a flowchart illustrating an embodiment of a process 800 suitable for processing variable length macroinstructions, such as macroinstructions stored in the variable length macroinstruction format 250 shown in FIG. 3. The process 800 may be carried out, for example, by the processor 102 which may include the speculative instruction length decode chain systems 300, 350, 500, 600, and/or 720. In the depicted embodiment, the process 800 may receive (block 820) one or more macroinstructions and store the macroinstructions in a buffer, such as the instruction buffers 352, 512. The buffer may then be processed (block 804), for example, via circuitry such as PLA circuitry 354, 514, to encode certain information. The encoded information may include speculative instruction length(s), for example, based on using a first few (e.g., one, two, three and/or four) bytes to determine likely lengths for the macroinstruction(s). The lengths may be derived, for example, via a lookup table detailing one or more likely lengths for a subset (e.g., one, two, three, and/or four) of the bytes. The encoded information may also include one-hot encodings, such as described above with respect to selector vectors 452, 513, 634, 746, 748, and/or 756. The encoded information may also include outputs 420-452, 532-538, 730-748, and/or 758-772.

The process 800 may then transmit (block 806) the information to the multiplexers of the speculative instruction length decode chain systems 300, 350, 500, 600, and/or 720. For example, the process 800 may transmit the selector vectors 452, 513, 634, 746, 748, 756, and/or the outputs 420-452, 532-538, 730-748 to the speculative instruction length decode chain systems 300, 350, 500, 600, and/or 720. The process 800 may then use the speculative instruction length decode chain systems 300, 350, 500, 600, and/or 720 to process (block 810) the transmitted information in one processor cycle. For example, speculative instruction length decode chain systems (e.g., systems 300, 350, 500, 600, and/or 720) may be used to process data at both high and low pulses (e.g., pulses 451, 472, 533, 535, 632, 660) of the single processor cycle. Processing (block 810) macroinstruction data in one processor cycle may then result in marked bytes 812 marking a start and end for one or more macroinstructions received (block 802) in the buffer. The process 800 may then execute (block 814) the macroinstructions identified by the marked bytes 812, for example, via further staging, steering, decoding, and execution of microinstructions as described with respect to FIG. 4. The process 800 may then iterate to block 802 and process other macroinstruction bytes received via the buffer.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A system, comprising:
   an instruction buffer configured to store a plurality of bytes representative of one or more macroinstructions executable via a processor; and
   instruction length decoder circuitry communicatively coupled to the instruction buffer, comprising:
      non-sequential first multiplexer circuitry, comprising:
         a plurality of first input lines that receive a first input data representative of a speculative length of a first macroinstruction of the one or more macroinstructions, and a first selector that selects from the first input lines via a one-hot selector vector; and
         a first output line communicatively coupled to a selection circuitry, wherein the first output line causes the selection circuitry to select from a second input data representative of a first location of a first ending byte for the first macroinstruction with respect to a value x, and wherein the instruction length decoder circuitry is configured to output a first macroinstruction start byte location and a first macroinstruction end byte location based on at least the first multiplexer circuitry and the selection circuitry, wherein the instruction length decoder circuitry determines the first macroinstruction start byte location and the first macroinstruction end byte location in one cycle of the processor.

2. The system of claim 1, wherein the instruction length decoder circuitry comprises:
   a second multiplexer circuitry included in the selection circuitry, wherein the second multiplexer comprises a plurality of second input lines that receive the second input data and a second selector communicatively coupled to the first output line that selects from the second input lines; and
   a third multiplexer circuitry comprising a plurality of third input lines that receive a third input data representative of a speculative length of a second macroinstruction of the one or more macroinstructions and a third selector that selects from the third data input via a second multiplexer output line from the second multiplexer circuitry, and wherein the instruction length decoder circuitry is configured to output a second macroinstruction start byte based on at least the first multiplexer circuitry, the second multiplexer circuitry, and the third multiplexer circuitry.

3. The system of claim 2, wherein the instruction length decoder circuitry comprises a fourth multiplexer circuitry comprising a plurality of four input lines that receive a fourth input data representative of a second location of a second ending byte for the second macroinstruction with respect to the value x and a fourth selector that selects from the fourth input data via a third multiplexer output line from the third multiplexer circuitry, and wherein the instruction length decoder circuitry is configured to output the second macroinstruction start byte and a second macroinstruction end byte based on at least the first multiplexer circuitry, the second multiplexer circuitry, the third multiplexer circuitry, and the fourth multiplexer circuitry.

4. The system of claim 3, wherein the first multiplexer circuitry, the second multiplexer circuitry, the third multiplexer circuitry, and the fourth multiplexer circuitry process all inputs in one cycle of the processor.

5. The system of claim 4, wherein the first multiplexer circuitry and the second multiplexer circuitry process the first and the second input data in a high pulse portion of the one cycle of the processor and wherein the third multiplexer circuitry and the fourth multiplexer circuitry process the third and the fourth input data in a low pulse portion of the one cycle of the processor.

6. The system of claim 3, wherein a fourth multiplexer output from the fourth multiplexer circuitry is transmitted into the first selector of the first multiplexer circuitry to replace the one-hot selector vector after a first use of the one-hot selector vector.

7. The system of claim 1, comprising a data encoding circuitry communicatively coupled to the instruction buffer, to the first multiplexer circuitry, and to the selection circuitry, wherein the data encoding circuitry is configured to transform the one or more macroinstructions into the speculative length, the one-hot selector vector, or a combination thereof.

8. The system of claim 7, wherein the data encoding circuitry comprises at least one programmable logic array (PLA).

9. The system of claim 1, wherein the one or more macroinstructions are encoded via a variable length encoding format.

10. The system of claim 1, wherein the value x=7 and wherein the instruction buffer stores at least 32 bytes representative of the one or more macroinstructions.

11. A method, comprising:
   storing, via an instruction buffer, a plurality of bytes representative of one or more macroinstructions executable via a processor;
   receiving, via a non-sequential first multiplexer circuitry included in an instruction length decoder circuitry, a first input data representative of a speculative length of a first macroinstruction of the one or more macroinstructions;
   selecting, via the non-sequential first multiplexer circuitry, the first input data via a first selector comprising a one-hot selector vector;
   receiving, via a second multiplexer circuitry, a second input data representative of a first location of a first ending byte for the first macroinstruction with respect to a value x;
   selecting, via the second multiplexer circuitry, the second input data via a second selector comprising a first multiplexer output from the first multiplexer circuitry; and
   outputting, via the instruction length decoder circuitry, a first macroinstruction start byte location and a first macroinstruction end byte location of the first macroinstruction based on at least the first multiplexer circuitry and the second multiplexer circuitry, wherein the instruction length decoder circuitry outputs the first macroinstruction start byte location and the first macroinstruction end byte location in one cycle of the processor.

12. The method of claim 11, comprising:
   receiving, via a third multiplexer circuitry, a third input data representative of a speculative length of a second macroinstruction of the one or more macroinstructions;
   selecting, via the third multiplexer circuitry, the third input data via a third selector comprising a second multiplexer output from the second multiplexer circuitry; and
   outputting, via the instruction length decoder circuitry, a second macroinstruction start byte based on at least the first multiplexer circuitry, the second multiplexer circuitry, and the third multiplexer circuitry.

13. The method of claim 12, comprising:
   receiving, via a fourth multiplexer circuitry, a fourth input data representative of a second location of a second ending byte for the second macroinstruction with respect to the value x;
   selecting, via the fourth multiplexer circuitry, the fourth input data via a fourth selector comprising a third multiplexer output from the third multiplexer circuitry; and
   outputting, via the instruction length decoder circuitry, the second macroinstruction start byte and a second macroinstruction end byte based at least in part on the first multiplexer circuitry, the second multiplexer circuitry, the third multiplexer circuitry, and the fourth multiplexer circuitry.

14. The method of claim 13, comprising replacing the one-hot selector vector as the first selector with a fourth multiplexer output from the fourth multiplexer after a first use of the one-hot selector vector.

15. The method of claim 13, comprising processing the first and the second input data via the first multiplexer circuitry and the second multiplexer circuitry in a high pulse portion of one processing cycle and processing the third and the fourth input data via the third and the fourth multiplexers in a low pulse portion of the one cycle of the processor.

16. A system, comprising:
an instruction length decoder circuitry, comprising:
a non-sequential first multiplexer circuitry, comprising:
a plurality of first input lines that receive a first input data representative of a speculative length of a first macroinstruction of one or more macroinstructions stored in an instruction buffer, and a first selector that selects from the first input data; and
a selector comprising a plurality of second input lines that receive a second input data representative of a first location of a first ending byte for the first macroinstruction, wherein the second input data is selected via a second selector, and wherein the instruction length decoder circuitry is configured to output a first macroinstruction start byte location and a first macroinstruction end byte location based on at least the non-sequential first multiplexer circuitry and the selector, wherein the instruction length decoder circuitry determines the first macroinstruction start byte location and the first macroinstruction end byte location in one cycle of the processor.

17. The system of claim 16, wherein the first selector comprises a 4 bit selector and wherein the second selector comprises a 2 bit selector, and wherein the first and second selectors are representative of an instruction length.

18. The system of claim 16, wherein the instruction length decoder circuitry comprises a second multiplexer circuitry having the selector, wherein the second multiplexer comprises a plurality of second input lines that receive the second input data and a second selector communicatively coupled to the first output line.

19. The system of claim 16, wherein the first selector comprises a one-hot selector vector during a first cycle of a processor and wherein the second selector comprises a first multiplexer output from the first multiplexer circuitry.

20. The system of claim 19, comprising a third multiplexer circuitry configured to receive a third input data representative of a speculative length of a second macroinstruction of the one or more macroinstructions, and a fourth multiplexer circuitry configured to receive a fourth input data representative of the speculative length of the second macroinstruction, wherein the first selector comprises an output of the fourth multiplexer circuitry during a second cycle of the processor.

* * * * *